United States Patent [19]

Schneider et al.

[11] 4,266,316
[45] May 12, 1981

[54] SUCTION TUBE ASSEMBLY FOR RING FURNACE

[75] Inventors: Paul A. Schneider, Oslo; Carlo Eliassen, Ardalstangen, both of Norway

[73] Assignee: Ardal Og Sunndal Verk A.S., Oslo, Norway

[21] Appl. No.: 77,761

[22] Filed: Sep. 21, 1979

[51] Int. Cl.³ .............................................. A47L 5/14
[52] U.S. Cl. ...................................... 15/304; 15/345; 15/395
[58] Field of Search ..................... 15/316 R, 345, 346, 15/406, 408, 301, 304, 394, 395

[56] References Cited

U.S. PATENT DOCUMENTS

| | | | |
|---|---|---|---|
| 1,311,866 | 8/1919 | Armstrong | 15/304 X |
| 2,263,070 | 11/1941 | Cusick | 15/345 X |

FOREIGN PATENT DOCUMENTS 1214147 4/1964 Fed. Rep. of Germany .
2321286 4/1973 Fed. Rep. of Germany .

*Primary Examiner*—Christopher K. Moore
*Attorney, Agent, or Firm*—Wenderoth, Lind & Ponack

[57] ABSTRACT

A suction tube unit for removing packing coke from vertical spaces within a ring furnace for producing carbon bodies includes a plurality of elongated suction and air supply tubes, the tubes being arranged to extend parallel to each other and being aligned in a single straight row, with each adjacent pair of the suction tubes being separated by a separate one of the air-supply tubes, thus forming an elongated assembly adapted to fit within the vertical space of the furnace. The assembly is supported at an upper portion thereof by a telescopic mounting. All of the tubes are open at lower ends thereof. A suction device is connected to the upper end of the suction tubes for creating a vacuum within the suction tubes to thereby withdraw the packing coke therethrough. Upper portions of the air-supply tubes have therein orifices to supply ambient air into the air-supply tubes and to aid in withdrawal of the packing coke through the suction tubes.

3 Claims, 2 Drawing Figures

SUCTION TUBE ASSEMBLY FOR RING FURNACE

BACKGROUND OF THE INVENTION

This invention relates to a ring furnace for producing carbon bodies for the electrometallurgical industries, and refers, more specifically, to a suction tube assembly for removing hot packing coke from a chamber of such furnace.

The carbon bodies which are used in cells for the electrolytic production of aluminum are made of a mixture, or a paste, which consists of calcined anthracite, petroleum coke and pitch, in combinations varying with the raw materials and the purpose of the body. Pitch is used as a binder.

Carbon bodies are also used in furnaces for electrothermal processes, in linings and as electrodes. For making these bodies, other mixtures are used, but the principles are the same.

After mixing in a mixing machine, this paste or mixture is firm at room temperature, becomes softer over 100°-150° C., and at higher temperatures and volatile components are driven off, and the binder becomes carbonized, whereupon the paste becomes rigid and hard. This thermal treatment is known as baking. It can be effected in the reduction cell itself, in that the heat developed therein bakes the filled carbon paste. However, in more recent times, it is preferred to perform this baking in separate furnaces, since this enables better control of the baking process and thereby the properties of the finished product.

The carbon bodies which are put in such a furnace for baking are often referred to as "green" carbons, the word "green" implying that they are not "ripe". They are produced by pressure or by vibration. The green carbons can be made to be of considerable size. Cathode carbon blocks, for example, may measure 700 mm × 900 mm × 4,000 mm, and weight about 4 tons. It is clear that when such a body is heated up and passes through a softening temperature zone, it will become deformed unless special steps are taken. The green carbons and therefore placed in high pits in the furnace which are built of refractory materials, the space between the green carbons and the walls of the pit being filled with coke breeze, i.e. small pieces of coke. This coke breeze also protects the green carbons from combustion.

A given number of pits form a chamber, and a number of chambers are built together to form a ring furnace with a separate cover over each chamber. Hot combustion gasses are conducted into a chamber of such furnace, flow through hollow refractory pit walls and then on to the next chamber. The firing zone wanders through the whole furnace in order thereby to make best possible use of the heat. The baking of the green carbons is completed sequentially and the chambers containing the finished carbons must be left to cool for some time before they can be emptied of packing coke and the baked carbon bodies lifted out. During the baking process, the temperatures reaches 1,280° C., and the entire cycle takes some three weeks.

Ring furnaces have large dimensions. Cranes over the furnace may, for example, have a span of some 30 m. The installations are costly and it is therefore necessary to make efficient use of the heat energy, and to reduce labour time by means of expedient aids.

The physical work in operating ring furnaces consists mainly of emptying the chambers at the end of a cycle and refilling them with green carbons and packing coke for the next cycle.

The emptying of an individual chamber consists of lifting off the lid and then sucking up the packing coke in order to expose the baked carbons. Suction is the most practical method of removing the coke breeze.

The sucking up of the coke breeze is usually performed by lowering a suction tube down into the packing coke. This tube is usually suspended by a crane, and telescopically connected with a silo and suction coupling on the crane bridge. The tube is lowered down into the loose coke mainly by its own weight, and is often guided manually by handles welded on the tube. The operator concerned must therefore sit on the side wall of of a chamber over the hot coke, and is exposed to heat and dust for the considerable length of time it can take to empty a chamber.

The method of operating the suction tube is thus laborious and not entirely efficient. If the end of the tube penetrates too far down into the coke, insufficient air is sucked in for the satisfactory transportation of the coke in the tube, with partial or complete stoppage being the result.

SUMMARY OF THE INVENTION

The present invention provides a novel design of a suction tube which completely releases the operator from this strenuous work, while at the same time the efficiency of the tube is substantially improved, increasing in turn the capacity of the installation.

The principle of the present invention is that adjacent to the suction tube there is disposed an air-supply tube, with its orifice at the same level as the orifice of the suction tube, and that several such pairs are disposed along a straight line. A further feature of the invention is that the suction tube assembly is so dimensioned that it can be lowered down into the pit between the wall and the baked carbons, and finally that the suction tube assembly can be guided from a crane in both the horizontal and the vertical planes.

The suction tube assembly is also suitable for cleaning the bottom of a pit after the carbons have been removed therefrom.

The operator sits in a sealed cab on the crane, supplied with fresh air, and has a good overall view of the workpiece. This helps to illustrate that the working conditions have been improved.

Work efficiency is also substantially improved. It has proved possible to use a stronger fan, and this, in conjunction with the directly controlled flow of transport air, has made it possible to reduce the time required to empty a chamber from about two hours to less than half an hour. The crane and crane driver are thus freed for performing other operations connected with production.

Because the operator is protected, suction can start earlier, with the result that the firing advance cycle can be shortened, thus increasing the capacity of the furnace.

BRIEF DESCRIPTION OF THE DRAWINGS

The invention is described below in more detail, with reference to the attached drawings, in which.

DETAILED DESCRIPTION OF THE INVENTION

Figure 1:
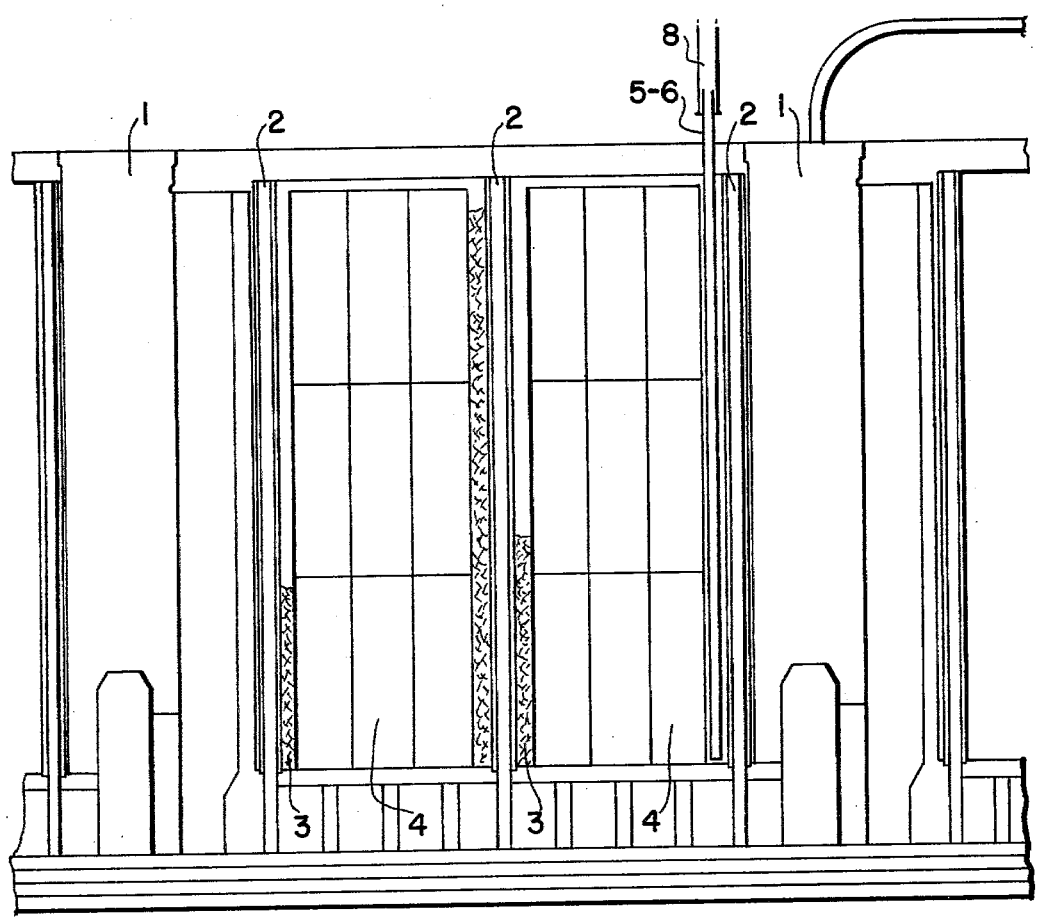
FIG. 1 is a schematic section of a chamber with packing coke, carbon bodies and the suction tube assembly of the invention.
Figure 2:
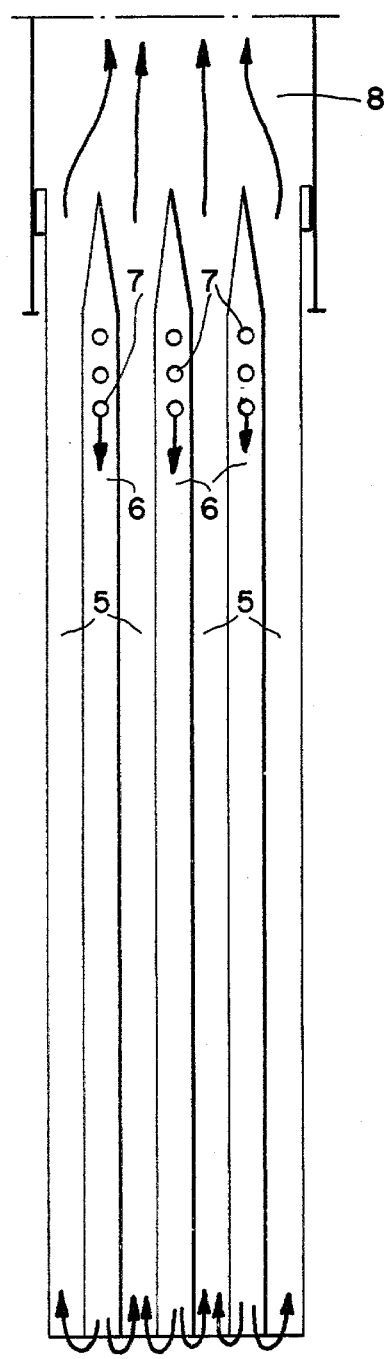
FIG. 2 is a schematic transverse section of parts of the suction tube assembly.

The suction tube assembly of the invention is shown in FIG. 1 as being employed in a system including chamber wall 1, pit wall 2, packing coke 3, shown partly removed, and carbon bodies 4. FIG. 2 illustrates suction tubes 5, air-supply tubes 6 with holes or orifices 7, and telescopic guide 8.

The suction tubes 5 and air-supply tubes 6 are arranged to extend parallel to each other and are aligned in a single straight row, with each adjacent pair of suction tubes 5 being separated by separate one of the air-supply tubes 6, as shown in FIG. 2, thus forming an elongated and thin assembly of dimensions sufficient to be vertically extended into and fit within a vertical space filled with packing coke 3, as shown in FIG. 1. Telescopic guide 8 supports the assembly at an upper portion thereof for vertically and horizontally guiding the assembly within the vertical space and into the packing coke 3 therein. The suction tubes 5 and air-supply tubes 6 have open lower ends, as shown in FIG. 2. The upper ends of the suction tubes 5 are open and communicate with a source of vacuum to create a vacuum within the suction tubes and to thereby withdraw the packing coke 3 from the vertical space in the furnace upwardly through the suction tubes 5. Upper portions of the air-supply tubes 6 have therein the holes or orifices 7 which open into the surrounding ambient atmosphere, such that upon the creation of the vacuum within the suction tubes 5 and in response to such vacuum only, ambient air enters the air-supply tubes 6 and flows downwardly therethrough, thereby facilitating and aiding the withdraw upwardly through the suction tubes 5 of the packing coke 3.

The air enters through the air supply tubes 6, through holes 7. It is solely the suction from 5 which causes air to enter holes 7 and flow through tube 6 down into the coke.

I claim:

1. A suction tube unit for use in a ring furnace for producing carbon bodies used in the metallurgical industries, such furnace being of the type including at least one baking chamber substantially filled with carbon bodies to be baked, with narrow vertical spaces between the carbon bodies and the chamber walls, such vertical spaces being filled with small pieces of packing coke during operation of the furnace, said suction tube unit being employed for removing the packing coke from the vertical spaces during unloading of the furnace, said suction tube unit comprising:

a plurality of elongated suction tubes and a plurality of elongated air-supply tubes, said tubes being arranged to extend parallel to each other and being aligned in a single straight row, with each adjacent pair of said suction tubes being separated by a separate one of said air-supply tubes, thereby forming an elongated and thin assembly of dimensions sufficient to be vertically extended into and to fit within a furnace vertical space filled with packing coke;

telescopic mounting means supporting said assembly at an upper portion thereof for vertically and horizontally guiding said assembly within a furnace vertical space and into packing coke therein;

said suction tubes and said air-supply tubes having substantially downwardly facing open lower ends;

suction means, connected to upper ends of said suction tubes, for creating a vacuum within said suction tubes and for thereby withdrawing the packing coke from the furnace vertical space upwardly through said suction tubes; and upper portions of said air-supply tubes having therein orifice means opening into the surrounding ambient atmosphere for, upon the creation of said vacuum within said suction tubes and in response to said vacuum, causing ambient air to enter said air-supply tubes and flow downwardly therethrough and for thereby facilitating the withdrawal upwardly through said suction tubes of the packing coke.

2. A unit as claimed in claim 1, wherein the upper end of each said air-supply tube is closed and has an upwardly pointed configuration.

3. A unit as claimed in claim 1, wherein said assembly is a single integral member with adjacent said tubes in close abutting relationship.

* * * * *